US010815435B2

(12) United States Patent
Subramaniyam

(10) Patent No.: US 10,815,435 B2
(45) Date of Patent: Oct. 27, 2020

(54) ADDITIVE COMPOSITION FOR DEMULSIFICATION OF WATER-IN-OIL EMULSION, AND METHOD OF USE THEREOF, AND METHOD OF DEMULSIFICATION

(71) Applicant: Dorf Ketal Chemicals (India) Private Limited, Mumbai (IN)

(72) Inventor: Mahesh Subramaniyam, Mumbai (IN)

(73) Assignee: Dorf Ketal Chemicals (India) Private Limited, Mumbai (IN)

( * ) Notice: Subject to any disclaimer, the term of this patent is extended or adjusted under 35 U.S.C. 154(b) by 304 days.

(21) Appl. No.: 15/576,573

(22) PCT Filed: Jun. 13, 2016

(86) PCT No.: PCT/IB2016/053481

§ 371 (c)(1),
(2) Date: Nov. 22, 2017

(87) PCT Pub. No.: WO2017/001957

PCT Pub. Date: Jan. 5, 2017

(65) Prior Publication Data

US 2018/0163145 A1 Jun. 14, 2018

(30) Foreign Application Priority Data

Jul. 1, 2015 (IN) ........................ 2515/MUM/2015

(51) Int. Cl.

*B01D 17/04* (2006.01)
*C10G 33/04* (2006.01)
*C10G 31/08* (2006.01)

(52) U.S. Cl.

CPC ........... *C10G 33/04* (2013.01); *B01D 17/047* (2013.01); *C10G 31/08* (2013.01); *B01D 2256/24* (2013.01); *B01D 2257/80* (2013.01)

(58) Field of Classification Search

CPC ............. B01D 17/047; B01D 2256/24; B01D 2257/80; C10G 31/08; C10G 33/04

See application file for complete search history.

(56) References Cited

U.S. PATENT DOCUMENTS

| | | | | |
|---|---|---|---|---|
| 2,499,370 | A * | 3/1950 | Keiser | C10G 33/04 516/183 |
| 3,259,587 | A | 7/1966 | Dickson et al. | |
| 5,284,635 | A * | 2/1994 | Frederic | B01D 17/0202 208/208 R |
| 2004/0014824 | A1* | 1/2004 | Leinweber | C08L 61/14 516/183 |
| 2009/0276965 | A1* | 11/2009 | Lang | C11D 3/2068 8/139 |
| 2013/0233770 | A1 | 9/2013 | Subramaniyam | |
| 2013/0240409 | A1* | 9/2013 | Subramaniyam | C10L 3/103 208/240 |
| 2014/0183102 | A1* | 7/2014 | Subramaniyam | C10G 21/16 208/291 |
| 2017/0037303 | A1* | 2/2017 | Waller | C09K 8/605 |
| 2018/0100096 | A1* | 4/2018 | Wylde | C07C 15/113 |
| 2018/0163145 | A1* | 6/2018 | Subramaniyam | B01D 17/047 |

FOREIGN PATENT DOCUMENTS

| | | |
|---|---|---|
| EP | 3316982 B1 | 2/2020 |
| IN | 2515/MUM/2015 | 7/2015 |
| WO | 2017001957 A1 | 1/2017 |

OTHER PUBLICATIONS

Foreign communication from a related counterpart application—International Preliminary Report on Patentability, PCT/IB2016/053481, dated Aug. 18, 2017, 15 pages.

Foreign communication from a related counterpart application—International Search Report and Written Opinion, PCT/IB2016/053481, dated Sep. 30, 2016, 9 pages.

* cited by examiner

*Primary Examiner* — Michael A Salvitti
(74) *Attorney, Agent, or Firm* — Conley Rose, P.C.; Rodney B. Carroll

(57) ABSTRACT

The present invention relates to a demulsification composition for demulsification of water-in-oil emulsion formed due to mixing of wash water in the crude oil, wherein the composition comprises (a) a compound selected from the group comprising glyoxal, neutralized glyoxal, glyoxal derivative and a mixture thereof, and (b) one or more demulsifiers. In one embodiment, the present invention relates to a method of demulsification of water-in-oil emulsions by treating it with the present demulsification composition. In another embodiment, the present invention relates to a method of using the present additive composition for demulsification of water-in-oil emulsions.

14 Claims, No Drawings

ADDITIVE COMPOSITION FOR DEMULSIFICATION OF WATER-IN-OIL EMULSION, AND METHOD OF USE THEREOF, AND METHOD OF DEMULSIFICATION

CROSS REFERENCE TO RELATED APPLICATIONS

This application is a filing under 35 U.S.C. 371 of International Application No. PCT/IB2016/053481 filed Jun. 13, 2016, entitled "Additive Composition for Demulsification of Water-in-Oil Emulsion, and Method of Use Thereof, and Method of Demulsification," which claims priority to Indian Patent Application No. 2515/MUM/2015 filed Jul. 1, 2015, which applications are incorporated by reference herein in their entirety.

FIELD OF THE INVENTION

The present invention relates to additive composition for demulsification of water-in-oil emulsion.

In particular, the present invention relates to additive composition for demulsification of water-in-oil emulsion caused by mixing of wash water and crude oil.

More particularly, the present invention relates to additive composition for demulsification of water-in-oil emulsion caused by mixing of wash water and crude oil in the desalter unit of the refinery.

Even more particularly, the present invention relates to additive composition for demulsification of water-in-oil emulsion caused by mixing of wash water and crude oil in the desalter unit of the refinery, wherein the additive composition comprises:

a. a compound selected from the group comprising glyoxal, neutralized glyoxal and mixture thereof; and b. one or more demulsifiers.

In one embodiment, the present invention relates to a method of demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

In another embodiment, the present invention relates to a method of using the additive composition of the present invention for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

BACKGROUND OF THE INVENTION

The water-in-oil emulsions are formed in various industrial operations, and are responsible for substantial loss of various industrial ingredients including difficulties in separation of oil. Therefore, breaking of water-in-oil emulsions during the processing of oil is the requirement of the industry, particularly of the crude oil refinery industry wherein the wash water gets mixed with crude oil in the desalter unit of the refinery and forms water-in-oil emulsion.

Presently, the water-in-oil emulsion caused by mixing of wash water and crude oil is broken by addition of demulsifier to the wash water.

The main problem of using the demulsifiers is that these are to be used in higher amounts and required continuously through the processing of crude oil, which results in substantial increase in cost of processing of crude oil.

Another problem of using the demulsifiers is that these are expensive, which also results in substantial increase in cost of processing of crude oil.

More importantly, the presently used demulsifiers are condensation product of nonyl phenols, and presently, there is a need to reduce consumption of nonyl phenols in view of their cost and environmental adverse effects.

Therefore, there is a need to reduce, if total elimination is not possible, the requirement of demulsifiers so that above-discussed problems of use of demulsifiers may, at least, be minimized without loss of or sacrificing the industrial output of the crude oil processing units.

SUMMARY OF THE INVENTION

Therefore, the present invention aims at providing a solution to above-described existing industrial problems by providing:

i) effective additive composition for demulsification of water-in-oil emulsions, and ii) method of using the additive composition for demulsification of water-in-oil emulsions, and iii) method for demulsification of water-in-oil emulsions by employing the additive composition.

Accordingly, the main object of the present invention is to provide:

i) an additive composition for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

Accordingly, the other object of the present invention is to provide:

ii) a method of demulsification of water-in-oil emulsions by employing an additive composition of the present invention, particularly of water-in-oil emulsions caused by mixing of wash water and crude oil, more particularly of water-in-oil emulsions caused by mixing of wash water and crude oil in the desalter unit of the refinery.

Accordingly, another object of the present invention is to provide:

iii) a method of using the additive composition of the present invention for demulsification of water-in-oil emulsions, particularly of water-in-oil emulsions caused by mixing of wash water and crude oil, more particularly of water-in-oil emulsions caused by mixing of wash water and crude oil in the desalter unit of the refinery.

Accordingly, an object of the present invention is to provide an additive composition for demulsification of water-in-oil emulsions, which is preferably caused by mixing of wash water and crude oil, more preferably for demulsification of the water-in-oil emulsions caused by mixing of wash water and crude oil in the desalter unit of the refinery so as to reduce the amount of the presently used demulsifiers, which are condensation product of nonyl phenols, and hence, to reduce consumption of nonyl phenols, and thereby to reduce cost of processing and associated environmental adverse effects.

Other objects and advantages of present invention will become more apparent from the following description when read in conjunction with examples, which are not intended to limit scope of present invention.

DETAILED DESCRIPTION

With aim to overcome above-described industrial problems of the prior art and to achieve above-described objects of the present invention, the inventor has found that when a compound selected from the group comprising glyoxal, neutralized glyoxal, glyoxal derivative and a mixture thereof is added to one or more demulsifiers, the said compound, surprisingly and unexpectedly, results in substantial improvement of demulsification efficiency of the demulsifier, and thereby, results in substantial reduction of requirement of amount of the demulsifier, which results in substantial decrease in cost of processing of crude oil, and associated environmental adverse effects.

Further, as the glyoxal and neutralized glyoxal are less expensive than the demulsifiers, it further results in substantial decrease in cost of processing of the crude oil.

Accordingly, the present invention relates to a demulsification composition for demulsification of water-in-oil emulsion caused due to wash water in the crude oil, wherein the composition comprises:

a. a compound selected from the group comprising glyoxal, neutralized glyoxal, glyoxal derivative and a mixture thereof; and b. at least one (or one or more) demulsifiers.

In accordance with the present invention, the neutralized glyoxal is glyoxal having pH neutral to basic. The inventor has observed that the glyoxal is very acidic, and therefore, it may cause corrosion. Accordingly, neutralizing the glyoxal till its pH is neutral to basic avoids corrosion of crude oil processing unit, and still improves demulsification efficiency of the demulsifier.

In accordance with the present invention, the neutralized glyoxal is obtained by neutralizing the glyoxal with an amine or alkaline medium.

As per the present invention, the amine may include (or comprises) triethanol amine (TEA).

As per the present invention, the alkaline medium may include (or comprises) sodium hydroxide aqueous solution.

In accordance with the present invention, the neutralized glyoxal may also include (or comprise) neutralized derivative of glyoxal. Therefore, in the present invention, the term "neutralized glyoxal" or the term "neutralized derivative of glyoxal" have one and same meaning unless otherwise explicitly described.

In accordance with the present invention, the pH neutral to basic includes a pH varying from about 7 to about 12.

In accordance with the present invention, the glyoxal derivative may include (or comprise) methanol, ethanol, butanol, ethylene glycol derivatives of glyoxal, or a mixture thereof.

In accordance with one of the embodiments of the present invention, the demulsifier is selected from the group comprising condensation product of:

i) nonyl phenol and amyl phenol, and formaldehyde;
ii) nonyl phenol and butyl phenol, and formaldehyde;
iii) nonyl phenol and formaldehyde;
iv) amyl phenol and formaldehyde;
v) butyl phenol and formaldehyde;
vi) alkyl phenol and formaldehyde; and
vii) a mixture thereof.

In accordance with one of the embodiments of the present invention, the demulsifier is selected from the group comprising condensation product of:

i) cardanol, nonyl phenol and amyl phenol, and formaldehyde;
ii) cardanol, nonyl phenol and butyl phenol, and formaldehyde;
iii) cardanol, nonyl phenol and formaldehyde;
iv) cardanol, amyl phenol and formaldehyde;
v) cardanol, butyl phenol and formaldehyde;
vi) cardanol, alkyl phenol and formaldehyde; and
vii) a mixture thereof.

In accordance with one of the preferred embodiments of the present invention, the above-described condensation product is oxyalkylated.

Therefore, in accordance with one of the embodiments of the present invention, the demulsifier is selected from the group comprising oxyalkylated condensation product of:

i) nonyl phenol and amyl phenol, and formaldehyde;
ii) nonyl phenol and butyl phenol, and formaldehyde;
iii) nonyl phenol and formaldehyde;
iv) amyl phenol and formaldehyde;
v) butyl phenol and formaldehyde;
vi) alkyl phenol and formaldehyde; and
vii) a mixture thereof.

Therefore, in accordance with one of the embodiments of the present invention, the demulsifier is selected from the group comprising oxyalkylated condensation product of:

i) cardanol, nonyl phenol and amyl phenol, and formaldehyde;
ii) cardanol, nonyl phenol and butyl phenol, and formaldehyde;
iii) cardanol, nonyl phenol and formaldehyde;
iv) cardanol, amyl phenol and formaldehyde;
v) cardanol, butyl phenol and formaldehyde;
vi) cardanol, alkyl phenol and formaldehyde; and
vii) a mixture thereof.

In accordance with one of the preferred embodiments of the present invention, the above-described condensation products is oxyalkylated with ethylene oxide, propylene oxide, butylene oxide or their mixtures to result in oxyalkylated copolymers or oxyalkylated polymers thereof.

Therefore, in accordance with one of the embodiments of the present invention, the demulsifier is selected from the group comprising:

i) oxyalkylated nonyl phenol and amyl phenol formladehyde copolymers;
ii) oxyalkylated nonyl phenol and butyl phenol formladehyde copolymers;
iii) oxyalkylated nonyl phenol formaldehyde polymers;
iv) oxyalkylated amyl phenol formaldehyde polymers;
v) oxyalkylated butyl phenol formaldehyde polymers;
vi) oxyalkylated alkyl phenol formaldehyde polymers; and
vii) a mixture thereof.

Therefore, in accordance with one of the embodiments of the present invention, the demulsifier may be selected from a group comprising:

i) oxyalkylated cardanol, nonyl phenol and amyl phenol, and formaldehyde copolymers;
ii) oxyalkylated cardanol, nonyl phenol and butyl phenol, and formaldehyde copolymers;
iii) oxyalkylated cardanol, nonyl phenol and formaldehyde polymers;
iv) oxyalkylated cardanol, amyl phenol and formaldehyde polymers;
v) oxyalkylated cardanol, butyl phenol and formaldehyde polymers;
vi) oxyalkylated cardanol, alkyl phenol and formaldehyde polymers; and vii) a mixture thereof.

It may be noted that term "copolymer" means a polymer made from two different phenols and the term "polymer" means a polymer made from one phenol.

In accordance with the present invention, the molecular weight of the demulsifier of the present invention may vary from about 2000 to about 20000 daltons as measured by Gel Permeation Chromatography using the tetrahydro furan (THF) as solvent.

In accordance with the present invention, the composition comprises:

a) about 0.1 to about 99.1% by weight of the compound selected from the group comprising glyoxal, neutralized glyoxal, glyoxal derivative and a mixture thereof; and b) about 99.1 to about 0.1% by weight of the one or more demulsifiers.

In accordance with one of the preferred embodiments of the present invention, the composition may comprise:

a) about 0.1 ppm to about 1000 ppm of the compound selected from the group comprising glyoxal, neutralized glyoxal, glyoxal derivative and a mixture thereof; and b) about 0.5 ppm to about 200 ppm of the one or more demulsifiers, depending upon the nature of the crude oil.

It may be noted that as per present invention, the additive composition may be added to the crude oil phase or to the desalter wherein wash water is mixed with crude oil and forms a water-in-oil emulsion.

Accordingly, in one embodiment, the present invention relates to a method of demulsification of water-in-oil emulsions, particularly of water-in-oil emulsions formed by mixing of wash water and crude oil, more particularly of water-in-oil emulsions formed by mixing of wash water and crude oil in the desalter unit of the refinery, wherein the water-in-oil emulsion formed due to mixing of wash water in the crude oil is treated with the present demulsification composition comprising:

a. a compound selected from the group comprising glyoxal, neutralized glyoxal, glyoxal derivative and a mixture thereof; and b. at least one demulsifier.

Accordingly, in one embodiment, the present invention relates to a method of using the present additive composition for demulsification of water-in-oil emulsions, particularly of water-in-oil emulsions formed by mixing of wash water and crude oil, more particularly of water-in-oil emulsions formed by mixing of wash water and crude oil in the desalter unit of the refinery, wherein the present demulsification composition comprising:

a. a compound selected from the group comprising glyoxal, neutralized glyoxal, glyoxal derivative and a mixture thereof; and b. at least one demulsifier, is added to the water-in-oil emulsion formed due to mixing of wash water in the crude oil.

The present invention is now described with the help of following examples, which are not intended to limit scope of the present invention, but have been incorporated for the sake of illustrating the advantages of the present invention over the prior art.

EXAMPLES

The present compositions have been tested for their demulsification efficiency.

In the following examples, 1. the 'blank' is without any additive;
2. compound 'A' is demulsifier, which is base catalysed nonylphenol formaldehyde resin and used for comparison;
3. the present compositions comprise
i) compound 'A' and glyoxal; or
ii) compound 'A' and neutralized glyoxal, wherein the glyoxal has been neutralized with triethanol amine (TEA); and
4. the comparative compositions comprise:
a) compound 'A', and a compound selected from glycolic acid, glyoxylic acid, DL-malic acid, benzaldehyde, or glutaraldehyde.

In the following examples, the compound 'A' (the demulsifier) is 50% active, the glyoxal is 40% active, the neutralized glyoxal comprises 40% active glyoxal neutralized with 100% active triethanol amine (TEA); the glycolic acid, the glyoxylic acid and the DL-malic acid are 40% active.

In the following examples, the present additive composition and the prior art or comparative additive composition was added to the water-in-oil emulsion of water and crude oil formed after mixing of water and crude oil.

The results confirm that the addition of a compound selected from a group comprising glyoxal, neutralized glyoxal, glyoxal derivative and mixture thereof in one or more of the demulsifiers results in substantial increase of demulsification efficiency of the demulsifier. Accordingly, the present compositions overcome problems of the prior art.

In the following examples, the tests were carried out in portable electric desalter (PED) or electrostatic separator at 130° C., with water-in-oil emulsion comprising 5% by vol of wash water (pH of wash water was 6.6), and 95% by vol of crude oil from Western part of India.

In the following examples, 100 ml of water-in-oil emulsion of above is taken.

The values in the following Table 1 are of % by vol of water separated in PED tubes, i.e. 50% in below table means only 2.5 ml of initial 5 ml of wash water has been separated.

TABLE 1

| Additive | Dosage of Additive (ppm) | After 5 min | After 10 min | After 15 min | After 20 min |
|---|---|---|---|---|---|
| Blank | — | 0 | 0 | 0 | 0 |
| Compound 'A' (no additive) | 10 | 52 | 60 | 60 | 64 |
| Compound 'A' + glyoxal (as per the present invention) | 10 + 0.4 | 80 | 90 | 90 | 94 |
| Compound 'A' + glyoxal neutralized with TEA (as per the present invention) | 10 + 0.4 | 80 | 90 | 94 | 94 |
| Compound 'A' + glycolic acid (comparative composition) | 10 + 0.4 | 56 | 60 | 60 | 64 |
| Compound 'A' + glyoxylic acid (comparative composition) | 10 + 0.4 | 56 | 60 | 60 | 60 |
| Compound 'A' + DL-malic acid (comparative composition) | 10 + 0.4 | 60 | 70 | 70 | 74 |
| Compound 'A' + benzaldehyde (comparative composition) | 10 + 0.4 | 52 | 60 | 60 | 60 |
| Compound 'A' + glutaraldehyde (comparative composition) | 10 + 0.4 | 52 | 60 | 60 | 60 |

In above Table 1, the expression "10+0.4" means that the composition comprises:

a) 10 ppm of Compound 'A' (the demulsifier); and b) 0.4 ppm of the second component, which is either the glyoxal or the neutralized glyoxal (as per the present invention); or the glycolic acid, the glyoxylic acid; the DL-malic acid; the benzaldehyde; or the glutaraldehyde (for the purpose of comparison).

The above Table 1 confirms that the additives of the present invention, for example, glyoxal and the glyoxal neutralized with TEA till pH of glyoxal becomes neutral to basic. i.e. > or =to pH 7 have surprising and unexpected effects in improving the demulsification efficiency of the demulsifier to demulsify the water-in-oil emulsion formed by mixing of wash water in the crude oil.

Therefore, above experimental findings confirm synergistic, surprising and unexpected effects, and technical advantages of the present compositions in demulsifying the water-in-oil emulsion formed by mixing of wash water in the crude oil.

Furthermore, above experimental findings also confirm that the present compositions have better demulsification efficiency to demulsify the water-in-oil emulsion formed by mixing of wash water in the crude oil.

Furthermore, as amount of demulsifier has been substantially reduced to achieve desired demulsification efficiency, the present compositions are more economical and environmental friendly.

It may be noted that the term "about" as employed herein is not intended to enlarge scope of claimed invention, but has been incorporated only to include permissible experimental errors of the field of the present invention.

The invention claimed is:

1. A demulsification composition for demulsification of water-in-oil emulsion caused due to wash water in the crude oil, wherein the composition comprises:

A]. a compound selected from the group comprising:
(a) glyoxal,
(b) neutralized glyoxal, and
(c) a mixture thereof; and
B]. at least one demulsifier,
wherein the demulsifier is selected from the group comprising:
(i) condensation product selected from the group consisting of:
i) nonyl phenol and amyl phenol, and formaldehyde;
ii) nonyl phenol and butyl phenol, and formaldehyde;
iii) nonyl phenol and formaldehyde;
iv) amyl phenol and formaldehyde;
v) butyl phenol and formaldehyde;
vi) alkyl phenol and formaldehyde; or
vii) a mixture thereof;
(ii) condensation product selected from the group consisting of:
i) cardanol, nonyl phenol and amyl phenol, and formaldehyde;
ii) cardanol, nonyl phenol and butyl phenol, and formaldehyde;
iii) cardanol, nonyl phenol and formaldehyde;
iv) cardanol, amyl phenol and formaldehyde;
v) cardanol, butyl phenol and formaldehyde;
vi) cardanol, alkyl phenol and formaldehyde; or
vii) a mixture thereof;
(iii) oxyalkylated condensation product of (i) or (ii);
(iv) oxyalkylated condensation product of (i) or (ii) obtained by oxyalkylation with ethylene oxide, propylene oxide, butylene oxide or mixtures thereof;
(v) oxyalkylated copolymer or oxyalkylated polymer of the condensation product of (i) or (ii).

2. The demulsification composition as claimed in claim 1, wherein the neutralized glyoxal is glyoxal having pH neutral to basic.

3. The demulsification composition as claimed in claim 2, wherein the pH neutral to basic comprises a pH varying from about 7 to about 12.

4. The demulsification composition as claimed in claim 1, wherein the compound selected from group (A) comprises neutralized glyoxal, and the neutralized glyoxal is obtained by neutralizing the glyoxal with an amine or alkaline medium.

5. The demulsification composition as claimed in claim 4, wherein the amine comprises triethanol amine (TEA).

6. The demulsification composition as claimed in claim 4, wherein the alkaline medium comprises sodium hydroxide aqueous solution.

7. The demulsification composition as claimed in claim 1, wherein the compound selected from group (A) comprises neutralized glyoxal, and the neutralized glyoxal comprises neutralized derivative of glyoxal.

8. The demulsification composition as claimed in claim 1, wherein the demulsifier is selected from the group consisting of:
i) oxyalkylated nonyl phenol and amyl phenol, and formaldehyde;
ii) oxyalkylated nonyl phenol and butyl phenol, and formaldehyde;
iii) oxyalkylated nonyl phenol and formaldehyde;
iv) oxyalkylated amyl phenol and formaldehyde;
v) oxyalkylated butyl phenol and formaldehyde;
vi) oxyalkylated alkyl phenol and formaldehyde; or
vii) a mixture thereof.

9. The demulsification composition as claimed in claim 1, wherein the demulsifier is selected from the group consisting of:
i) oxyalkylated cardanol, nonyl phenol and amyl phenol, and formaldehyde;
ii) oxyalkylated cardanol, nonyl phenol and butyl phenol, and formaldehyde;
iii) oxyalkylated cardanol, nonyl phenol and formaldehyde;
iv) oxyalkylated cardanol, amyl phenol and formaldehyde;
v) oxyalkylated cardanol, butyl phenol and formaldehyde;
vi) oxyalkylated cardanol, alkyl phenol and formaldehyde; or
vii) a mixture thereof.

10. The demulsification composition as claimed in claim 1, wherein the demulsifier is selected from the group consisting of:
i) oxyalkylated nonyl phenol and amyl phenol formaldehyde copolymers;
ii) oxyalkylated nonyl phenol and butyl phenol formaldehyde copolymers;
iii) oxyalkylated nonyl phenol formaldehyde polymers;
iv) oxyalkylated amyl phenol formaldehyde polymers;
v) oxyalkylated butyl phenol formaldehyde polymers;
vi) oxyalkylated alkyl phenol formaldehyde polymers; or
vii) a mixture thereof.

11. The demulsification composition as claimed in claim 1, wherein the demulsifier is selected from the group consisting of:
i) oxyalkylated cardanol, nonyl phenol and amyl phenol, and formaldehyde copolymers;
ii) oxyalkylated cardanol, nonyl phenol and butyl phenol, and formaldehyde copolymers;

iii) oxyalkylated cardanol, nonyl phenol and formaldehyde polymers;
iv) oxyalkylated cardanol, amyl phenol and formaldehyde polymers;
v) oxyalkylated cardanol, butyl phenol and formaldehyde polymers;
vi) oxyalkylated cardanol, alkyl phenol and formaldehyde polymers; or
vii) a mixture thereof.

12. The demulsification composition as claimed in claim 1, wherein the composition comprises:
a) about 0.1 to about 99.1% by weight of the compound selected from the group comprising glyoxal, neutralized glyoxal, and a mixture thereof; and
b) about 99.1 to about 0.1% by weight of the one or more demulsifiers.

13. A method of demulsification of water-in-oil emulsions, wherein the water-in-oil emulsion is treated with the demulsification composition as claimed in claim 1.

14. A method of using the demulsification composition as claimed in claim 1 for demulsification of water-in-oil emulsion, wherein the demulsification composition is added to the water-in-oil emulsion formed due to mixing of wash water in the crude oil.

* * * * *